(12) United States Patent
Denise

(10) Patent No.: US 6,429,619 B2
(45) Date of Patent: Aug. 6, 2002

(54) GENERATOR COMPRISING TWO PAIRS OF DIFFERENTIAL OUTPUTS

(75) Inventor: Sylvain Denise, Vaureal (FR)

(73) Assignee: Sagem SA, Paris (FR)

( * ) Notice: Subject to any disclaimer, the term of this patent is extended or adjusted under 35 U.S.C. 154(b) by 8 days.

(21) Appl. No.: 09/785,688

(22) Filed: Feb. 16, 2001

(30) Foreign Application Priority Data

Feb. 29, 2000 (FR) .............................................. 00 02550

(51) Int. Cl.⁷ ................................................. H02P 8/00
(52) U.S. Cl. .................................................... 318/696
(58) Field of Search ................................ 318/685, 696, 318/601, 602, 604, 605, 656, 661

(56) References Cited

U.S. PATENT DOCUMENTS

| | | | | |
|---|---|---|---|---|
| 3,619,757 A | * | 11/1971 | Ioerger et al. | 318/685 |
| 4,652,806 A | * | 3/1987 | Aiello | 318/696 |
| 4,772,815 A | * | 9/1988 | Harned et al. | 310/171 |
| 4,884,016 A | * | 11/1989 | Aiello | 318/685 |
| 5,418,443 A | * | 5/1995 | Kikuchi | 318/807 |
| 5,574,351 A | * | 11/1996 | Jacobson et al. | 318/696 |
| 6,194,863 B1 | * | 2/2001 | Mainberger | 318/696 |

* cited by examiner

Primary Examiner—Bentsu Ro
(74) Attorney, Agent, or Firm—Quarles & Brady LLP

(57) ABSTRACT

The generator having two pairs of differential PWM outputs (11 –12, 21 –22), comprises
i) a microprocessor (1) having one normal PWM output,
ii) two assemblies (10, 20), each having two outputs (11 –12, 21 –22) and linked by an input to the normal PWM output (2) of the microprocessor (1), each assembly (10, 20) having one of its two outputs (11 –12, 21 –22) which corresponds to the PWM output (2) of the microprocessor (1),
iii) means (B) for inverting the two outputs (11 –12, 21 –22) of each assembly (10, 20).

4 Claims, 1 Drawing Sheet

GENERATOR COMPRISING TWO PAIRS OF DIFFERENTIAL OUTPUTS

The invention relates to the control of stepper motors, which are found for example in motor vehicle dashboards for driving needle-type indicators.

Broadly, a stepper motor comprises a stator, with two coils having orthogonal respective axes giving rise to two orthogonal magnetic fields, and a polarized rotor aligned along the resultant of the two stator fields. In order to turn the rotor and hence the magnetic resultant, the energy supplies to the two coils of the stator are made to vary. It is known practice to energize these coils from a micro-controller with differential PWM (pulse width modulation) outputs; a coil being energized through a pair of conductors, it is possible to control the sense of the difference in potentials at the two terminals of the coils so as to drive the vector of the magnetic resultant into one or other of the four quadrants of the trigonometric circle which are defined, as may be recalled, by the sine and the cosine of the angle θ of the resultant vector with the positive reference half-axis:

| quadrant 1 | $\cos\theta > 0, \sin\theta > 0$ |
| quadrant 2 | $\cos\theta < 0, \sin\theta > 0$ |
| quadrant 3 | $\cos\theta < 0, \sin\theta < 0$ |
| quadrant 4 | $\cos\theta > 0, \sin\theta < 0$ |

Since there is often a plurality of stepper motors in an item of equipment, the micro-controllers found on the market are those having differential PWM outputs capable of controlling several motors. This often results in the drawback of having a micro-controller which is either over-engineered or under-engineered and, in this case, with the additional drawback of having to provide one or more additional components to control the surplus motors.

The present invention aims to alleviate these drawbacks and to dispense with the expensive micro-controllers having differential PWM outputs.

Accordingly, it relates to a generator having at least two pairs of differential PWM outputs, characterized in that it comprises
i) a microprocessor having at least one normal PWM output,
ii) two assemblies, each having at least two outputs and linked by an input to the normal PWM output of the microprocessor, each assembly being configured so that one of its two outputs corresponds to the PWM output of the microprocessor,
iii) means for inverting the two outputs of each assembly.

Thus, from a simple microprocessor, having a normal PWM output, designed to vary between 0 and 1, stator controls are provided which are able to change sign by virtue of the inverting of the two outputs of each assembly, thus making it possible to select any angle in the four quadrants.

According to a first preferred embodiment, each assembly is configured so that the other of its two outputs remains at an extreme level, for example the higher level, of the PWM output and each assembly is linked, by another input, to an output of the microprocessor for inverting its two outputs.

According to a second preferred embodiment, the micro-processor comprises at least two normal PWM outputs respectively linked to the inputs of the two assemblies, each assembly being configured so that its two outputs are inverted.

The invention will be better understood with the aid of the following description of the generator of the invention, with reference to the appended drawing, in which.

Figure 1:
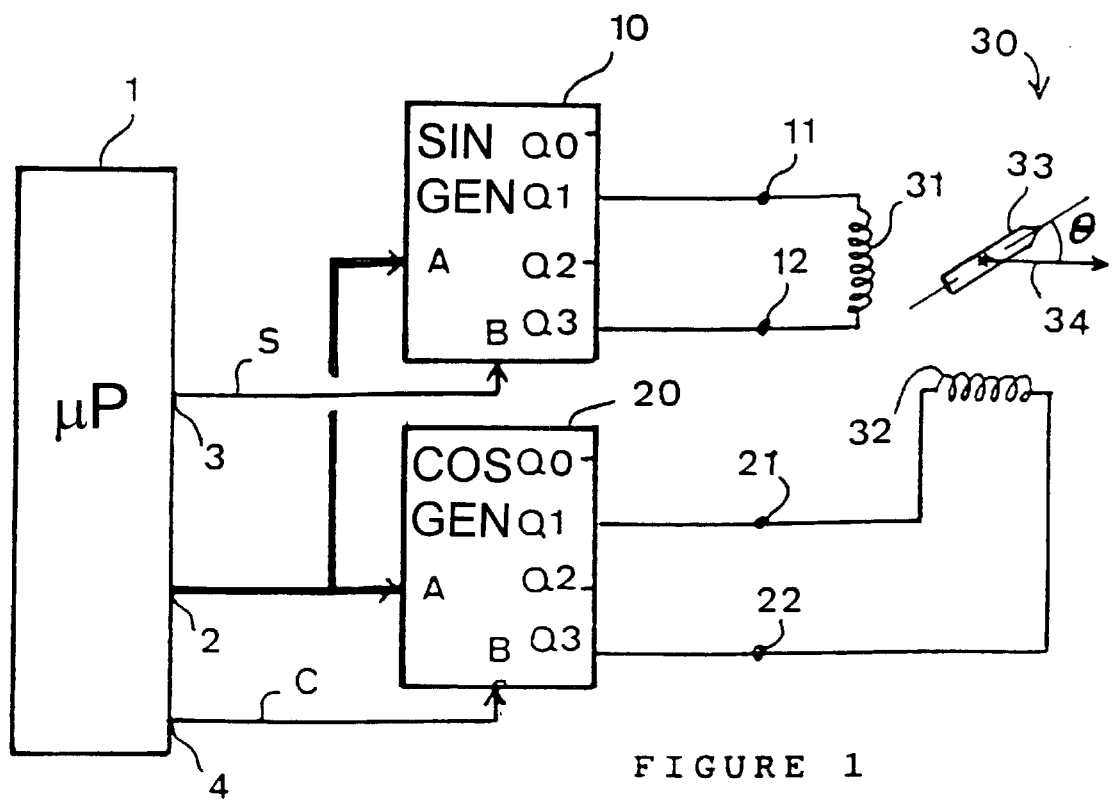
FIG. 1 represents the first embodiment mentioned above.

The generator represented in FIG. 1 controls a stepper motor 30 comprising a stator having two orthogonal coils 31 and 32. The generator comprises a microprocessor 1 having at least one PWM output, here one only, referenced 2, and two identical assemblies of circuits 10 and 20, each having at least one pair of outputs or terminals 11, 12 and 21, 22, each pair of outputs 11, 12 and 21, 22 differentially controlling the respective coils 31 and 32. The assembly 10 and the coil 31 deal with the sine of the angle θ which the rotor 33 of the motor 30 is to form with respect to a reference half-axis 34. The assembly 20 and the winding 32 pertain to the cosine θ.

Each assembly 10, 20 is linked, by an input referenced A, to the non-differential, normal PWM signal output 2 of the microprocessor 1. Likewise, each assembly 10, 20 is linked by an input referenced B, to a specific output 3, 4 of the microprocessor 1. Each assembly 10 (20) has a routing function with two output paths 11, 12 (21, 22), whose input B controls the routing of the PWM signal from the input A to one or the other of the two outputs 11, 12 (21, 22). The microprocessor 1 provides a bit S on the output 3 indicating the sign of sine θ and an associated bit C on the output 4, indicating the sign of cos θ. The pair of bits S and C therefore designate one out of the four possible quadrants.

In this example, the circuits 10 and 20 consist of a single integrated circuit having two independent demultiplexers, bearing the commercial reference 74xx139, xx designating the technological family chosen. Each demultiplexer in fact comprises four output paths Q0, Q1, Q2, Q3, which can be addressed or activated in succession by the inputs A and B. Only two of the four outputs are used, these being such that one or the other is addressed by change of state of just one of the bits A and B (here B). The other addressing bit, here A, makes it possible, through a temporary change of state, to address one of the two unused outputs and hence to eliminate any selection by addressing of the two useful outputs. The input A is therefore functionally an input for barring any selection of useful output.

It will be noted that any unaddressed output nevertheless ensures the provision of a predetermined logical voltage and/or of a control current, incoming or outgoing, of quiescent state. The absence of selection simply locks the relevant outputs in the quiescent state, prohibiting the switch to the opposite, so-called active, state.

Thus, by considering that the input A at 0 enables the selecting of the even outputs Q0 and Q2 and that the input B (high order) at 0 enables the selecting of the first two outputs Q0 and Q1, here the outputs Q1 (BA=01) and Q3 (BA=11) have been chosen as useful outputs 11 and 12. It would have been possible to chose Q0 and Q2, then activated when A=0. Furthermore, swapping the role of the inputs A and B, either one of the pairs Q0, Q1 and Q2, Q3 could have been chosen, the input A then controlling selection between the two useful outputs and the input B barring or otherwise these two selections.

In the case of the 74xx139 circuit used here, the quiescent state of the three unselected outputs at a give instant is the high logic state, or 1, and the active state, of selection, of the selected output is the low state, or 0. These two states represent the extreme levels, high and low, of the PWM output at the outputs 11 or 12.

The manner of operation of the above circuits will now be explained in greater detail.

The microprocessor 1 determines, according to a procedure which is outside the ambit of the present invention, the angle θ desired and hence its sine and cosine. It therefore fixes the value of the two sign bits S and C and thus controls the assemblies 10 and 20 as a function of the desired quadrant.

The detailed explanation of the operation of the assemblies 10 and 20 will be limited to the assembly 10, given that the assembly 20 operates likewise but with a specific control (bit C).

To simplify the account, two power integrator and amplifier circuits respectively linking the outputs 11, 12 to the two terminals of the coil 31 have not been represented. These power circuits provide, to within an amplification factor, the mean voltage of the PWM signal, in the case of the one, and a 1 state voltage, in the case of the other, and prevent any useless heating of the coil 31 by the AC component of the PWM signal. As a variant, the coil 31 itself constitutes the integrator owing to its self-inductive component, the PWM pulse repetition period being small enough with respect to the mechanical inertia of the rotor 33 to prevent any vibration.

For a positive sine θ, the mean voltage of the output 11 must here be greater than that of the output 12.

Since the two useful outputs Q1 and Q3 are in the 1 state when quiescent, which may be considered as representing an extreme level, here higher, of the PWM output 11 or 12, it is therefore required to route the PWM pulses from the output 2 to the output 12, Q3, so as to lower its mean level (at the output of the associated integrator). The bit S at the input B is then set to 1 so as to enable the selection of the outputs Q2, unused, and Q3. The PWM signal of the input A alternately selects the enabled outputs Q2 and Q3 at even and odd neighbouring addresses. During the fraction of the period of the PWM signal for which the latter is at the 1 level, the output Q3 is selected and goes to 0. The output Q3 then represents the complement of the PWM signal of the output 2.

The shape factor F of the PWM signal (duration of the 1 state relative to the PWM period) therefore defines a proportional reduction in the mean level, over this period, of the output Q3. A shape factor F equal to 1, of permanent 1 state, would latch the output Q3 to the 0 complementary state.

For a negative sine θ (S=0), the PWM signal is routed to the outputs Q0 and Q1 and it is then the mean level of the output Q1 which decreases from 1 to 0, while the other useful output Q3 remains in the permanent 1 state. It is then the output Q1 which represents the complement of the PWM signal of the output 2.

It will be understood that it would have been possible to choose a router having complementary logic to that of the router represented, in which the output quiescent states would have been a 0, and not a 1 as here.

In all cases, starting from two identical quiescent states, 0 or 1, for the two outputs 11, 12, one of them is made to vary periodically, upwards or downwards, with an adjustable shape factor F, so as to produce a difference in potential between the two outputs 11, 12, the choice of the output which is made to vary being determined by the sign of the sine desired. Hence, the two outputs 11, 12 are inverted, and hence so is the differential voltage between them, by swapping between the state of selection of the one and the state of non-selection of the other output.

The coil 32 is controlled according to the same principle so as to give rise to the magnetic force corresponding to the desired cosine θ. The shape factor F of the PWM signal common to the two assemblies 10 and 20 is adjusted so that the relative amplitudes of the control voltages of the windings 31 and 32 correspond to the relative value between the sine and the cosine of the angle θ. Stated otherwise, here one does not seek to obtain two well-determined electromagnetic forces for the two coils 31 and 32, which would require two independent PWM outputs at the level of the microprocessor 1, but one simply adjusts the ratio of the two forces, this requiring just one PWM.

Figure 2:
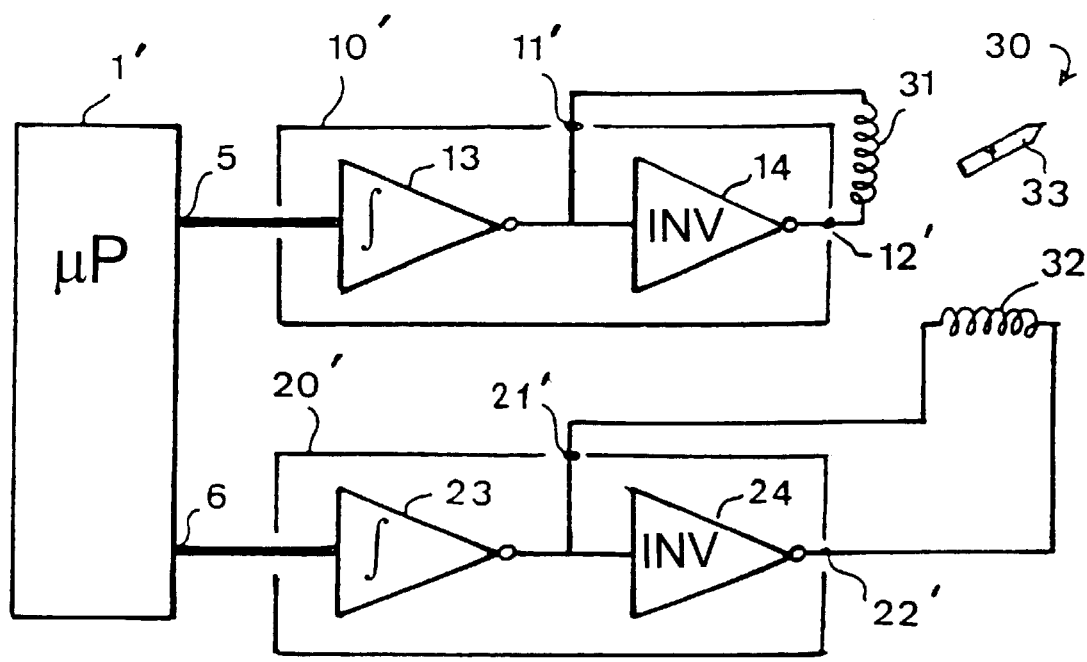
FIG. 2 represents the second embodiment.

In the example of FIG. 2, the microprocessor 1' comprises two normal PWM outputs 5, 6, having just one wire, respectively controlling identical assemblies 10' and 20' which, overall, are operationally the counterparts of the assemblies 10 and 20. The assembly 10' comprises a power amplifier/integrator 13, such as mentioned for the first embodiment, which controls a linear power inverter 14. The coil 31 is wired in parallel to the inverter 14, hence differentially controlled by the outputs 11', 12'. The cosine coil 32 is wired likewise (outputs 21', 22') to the output amplifier 24 controlled by the amplifier/integrator 23 of the assembly 20'.

Each of the two arrangements 10', 20' is equivalent to an H bridge with the coil 31 (32) energized in differential mode between the outputs of the two amplifiers 13, 14 (23, 24), each being able to operate as a current source when the other is at a lower potential and is absorbing the current from the coil 31 (32).

The value of the output 12' (after double inversion 13, 14) is the mean value F of the shape factor and the output 11' (after a single inversion 13) has the value 1−F.

The differential voltage of the output 11', relative to that of the output 12', is therefore equal to F−(1−F)=2F−1. It can therefore vary, in a continuous manner, from −1 to +1, for F varying from 0 to 1.

Each output amplifier 14 (24) makes it possible to construct, with the input amplifier 13 (23), an H bridge. This solution is a priori preferable to the possible variant which would consist in replacing the output amplifiers 14 (24) by a bi-directional supply circuit of fixed voltage (mid-point), the above H bridge thereafter having only one active side which can at will take a positive or negative voltage value with respect to the fixed mid-point voltage. However, the excitation voltage of the coils 31 and 32 would be half that in the case of FIG. 2, since it would not be in differential mode.

What is claimed is:

1. Generator having at least two pairs of differential PWM outputs (11–12, 21–22; 11'–12', 21'–22'), characterized in that it comprises i) a microprocessor (1, 1') having at least one normal PWM output, ii) two assemblies (10, 20; 10', 20'), each having at least two outputs (11–12, 21–22; 11'–12', 21'–22') and linked by an input to the normal PWM output (2) of the microprocessor (1, 1'), each assembly (10, 20; 10', 20') being configured so that one of its two outputs (11–12, 21–22; 11'–12', 21'–22') corresponds to the PWM output (2) of the microprocessor (1), iii) means (B) for inverting the two outputs (11–12, 21–22; 11'–12', 21'–22') of each assembly (10, 20; 10', 20').

2. Generator according to claim 1, in which each assembly (10, 20) is configured so that the other (12, 11; 22, 21) of its two outputs remains at an extreme level of the PWM output and each assembly (10, 20) is linked, by another input (B), to an output (3, 4) of the microprocessor (1) for inverting its two outputs (11, 12; 21,22).

3. Generator according to claim 2, in which the extreme level is the higher level.

4. Generator according to claim 1, in which the microprocessor (1') comprises at least two normal PWM outputs (5, 6) respectively linked to the inputs of the two assemblies (10', 20'), each assembly (10', 20') being configured so that its two outputs (11'–12', 21'–22') are inverted.

* * * * *